Feb. 11, 1930.  J. E. W. REEH  1,747,080
APPARATUS FOR CONGELATION
Filed Nov. 6, 1928  2 Sheets-Sheet 1

INVENTOR.
JOHANNES EMMERICK WOLFF REEH
By William C. Linton
Attorney.

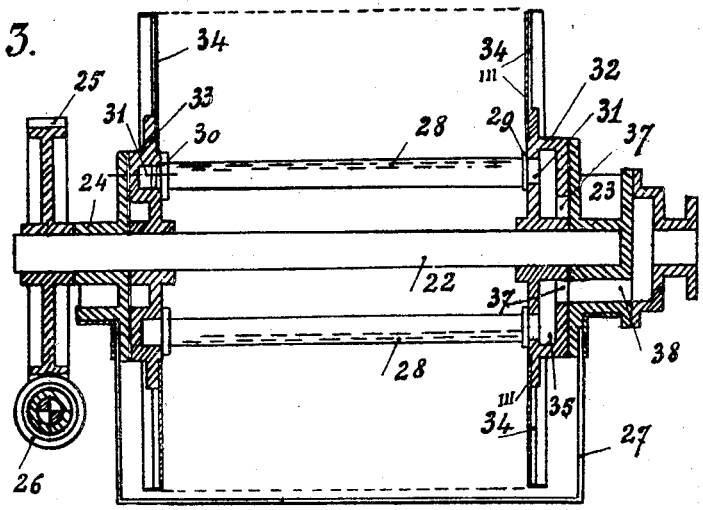
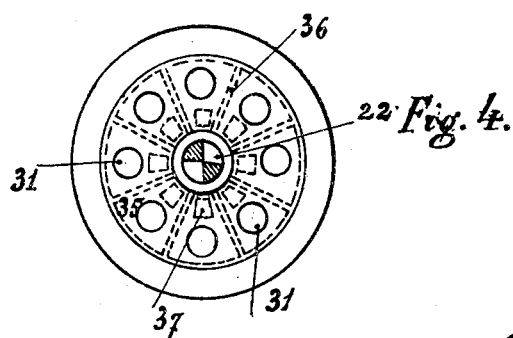
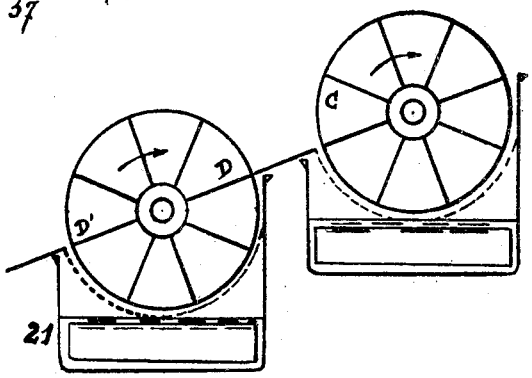

Patented Feb. 11, 1930

1,747,080

UNITED STATES PATENT OFFICE

JOHANNES EMMERICK WOLFF REEH, OF CHATENAY-SEINE, FRANCE, ASSIGNOR TO SOCIÉTÉ ANONYME DE CONSERVATION INDUSTRIELLE DU POISSON, OF PARIS, FRANCE

APPARATUS FOR CONGELATION

REISSUED

Application filed November 6, 1928, Serial No. 317,673, and in France November 8, 1927.

The present invention relates to an apparatus for the rapid congelation of various articles, and chiefly alimentary articles such as meat, fish or the like, for the better preservation of the said articles.

The apparatus according to the invention consists essentially of a drum which is divided by longitudinal and radial partitions into chambers adapted to contain the articles or subtances to be frozen. The said drum is rotatable on its axle and is provided at the central part with conduits supplying the freezing liquid and characterized by the particular feature consisting in the fact that they will deliver a shower of liquid upon the substances in said chambers only when the chambers are situated below the horizontal plane passing through the axis of the drum. After acting upon the said substances to be frozen, the liquid flows out through perforations in the external casing of the drum into a tank in which its temperature is again lowered, and it returns thence into the apparatus.

The said apparatus according to the invention will serve for the continuous congelation of large quantities of articles, and chiefly fish which are thus treated as fast as caught.

The following description, with reference to the appended diagrammatic drawings which are given by way of example, shows a constructional form of the said apparatus and the method by which the process may be carried into effect.

Fig. 3 is a lengthwise section analogous to Fig. 2 showing a modification.

Fig. 4 is a view of the distributing arrangement in section on the line III—III of Fig. 3.

Fig. 5 is a diagrammatic sectional view analogous to Fig. 1, showing two similar apparatus functioning in series.

Figure 1:
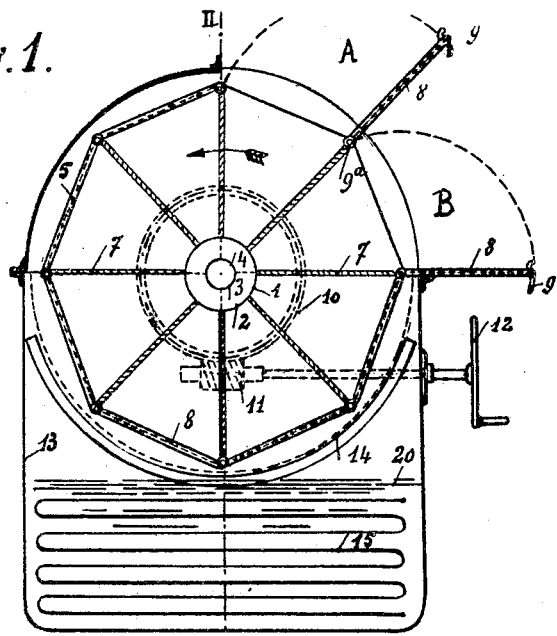
Fig. 1 is a cross section of the apparatus on the line I—I of Fig. 2.
Figure 2:
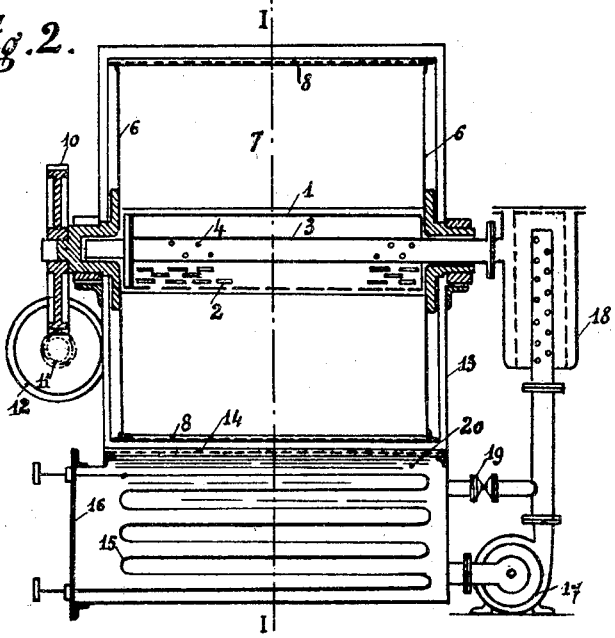
Fig. 2 is a lengthwise section on the line II—II of Fig. 1.

Referring to Figs. 1 and 2, the apparatus essentially comprises a stationary cylinder 1 having the perforations 2 on its lower half. The axle 3 of the said cylinder is hollow and is pierced with the perforations 4. A drum 5 is mounted concentric with the cylinder 1 and is rotatable about the latter. The said drum is closed at the ends by the plates 6—6 and comprises in the interior a set of radial partitions 7 which come almost in contact with the stationary distributing cylinder 1. The said partitions form a set of chambers which can be opened at the periphery of the drum by means of the perforated doors 8 each of which can be fastened in closed position by a latch 9.

The worm wheel 10 keyed to the drum 5 serves to rotate the latter by means of the worm 11 driven by a hand wheel 12.

The whole apparatus thus composed is placed within the tank 13 in which is disposed a perforated element or strainer 14 cooperating with the drum 5.

In the tank 13 is disposed the evaporating coiled pipe 15 of a refrigerating machine, said tank preferably having a removable side 16 for facilitating the insertion of the coil pipe 15. A circulation pump 17 is arranged for drawing the liquid from the bottom of the tank 13 and for delivering it, through the filter 18, into the hollow axle 3 of the stationary cylinder 1. The pipe 19 provided with an adjustable valve is adapted to make a direct connection between the tank and the delivery end of the pump, for all necessary regulation.

In the modification shown in Figs. 3 and 4, the drum which is divided into chambers is keyed to a shaft 22 which is mounted in two bearings 23—24 and is rotated, as hereinbefore described, by a worm wheel 25 and a worm 26; said drum rotates within a tank 27 to which the said bearings are secured.

Each chamber contains one or more perforated tubes 28 and each tube carries at one end a flange 29 provided with packing, and the other end is threaded and carries a nut 30, so that the said tubes can be removably mounted in relation to the apertures 31 of the cheeks 32—33 which are mounted on the shaft 22 and carry the end plate 34 of the said drum. The cheek 32 is recessed, and the recess is divided into chambers 35 by partitions 36 corresponding to the partitions of the chambers of the drum. Each tube 28 communicates with a corresponding chamber 35 which is provided on the other side with apertures 37, so that during the rotation of the drum the said apertures will register with the ports 38 formed in the lower part of the bearing 23 which is suitably supplied with the cooling liquid.

The operation of the apparatus is as follows:

The substances to be frozen are loaded at A (Fig. 1), and the cover 8 is then closed. The hand wheel is used to rotate the drum 5 in the direction of the arrow by the width of one chamber, and this succeeding chamber is loaded, and so on. When a loaded chamber is situated below the horizonal plane passing through the axis of rotation, the substances therein will be acted upon by the streams of liquid issuing from the apertures 2. As the loaded chambers return to the upper part, they are opened at B to be discharged. The strainer 14 partly surrounding the drum 5 serves to retain the said substances or other objects which might fall into the tank 13 due to improper handling. The liquid in the tank should entirely cover the coiled tube.

Fig. 5 shows the apparatus operating in series, and the apparatus are rotatable in the direction of the arrows. The chambers C and D are opened at the same time so that the articles will proceed by gravity from the first into the second. After rotating in the tank, the chamber D will come to D' and will then be emptied by gravity.

According to the process of the invention, the articles to be frozen are preliminarily coated with a substance whose freezing temperature is above the temperature necessary for the preservation of the frozen articles. I prefer to use a substance which is insoluble in the liquid in which the said articles are treated. For this purpose, oils may be employed as oil of sesame, maize, earthnut or the like, so that the said articles will each be surrounded by a sort of cold and solid coating, and will be thus entirely separated and protected while in the cooling liquid. It should however be noted that while this operation is preferable for certain articles, it may be dispensed with in the case of other articles with which its use would be difficult.

Having so described my said invention, I declare that what I claim is:

1. An apparatus for cooling and freezing fish or the like comprising a rotatably mounted drum divided into a plurality of compartments, means disposed within said drum for delivering refrigerating liquid to certain of the compartments of the drum with rotation of the latter, and means formed on said drum to permit the discharge of the refrigerating liquid from the compartments of the drum.

2. An apparatus for cooling and freezing fish or the like comprising a rotatably mounted drum divided into a plurality of longitudinal compartments, means, disposed axially of said drum for delivering a refrigerating liquid to the compartments of the drum, moving, with rotation of the latter, below the horizontal plane passing through the axis of said drum, and means formed on the drum to permit the discharge of the refrigerating liquid from the compartments of the drum.

3. An apparatus for cooling and freezing fish or the like comprising a rotatably mounted drum divided into a plurality of longitudinal compartments, a fixed conduit disposed axially of said drum and provided with perforations at its lower half portion for delivering a refrigerating liquid to the compartments of the drum, moving, with rotation of the latter, below the horizontal plane passing through the axis of said drum, and means formed on the drum to permit the discharge of the refrigerating liquid from the compartments of the drum.

4. An apparatus for cooling and freezing fish or the like comprising a rotatably mounted drum divided into a plurality of compartments, means disposed within said drum for delivering a refrigerating liquid to certain of the compartments of the drum with rotation of the latter, means formed on said drum to permit the discharge of the refrigerating liquid from the compartments of the drum, a tank adapted to receive the refrigerating liquid discharged from the compartments of said drum, and a pump for forcing the liquid from the tank into the liquid delivering means of the drum.

5. An apparatus for cooling and freezing fish or the like comprising a rotatably mounted drum divided into a plurality of longitudinal compartments. means disposed axially of said drum for delivering a refrigerating liquid to the compartments of the drum, moving, with rotation of the latter below the horizontal plane passing through the axis of said drum, means formed on the drum to permit the discharge of the refrigerating liquid from the compartments of the drum, a tank adapted to receive the refrigerating liquid discharged from the compartments of said drum, refrigerating means arranged in said tank, and a pump for forcing the liquid from the tank into the liquid delivering means of the drum.

6. An apparatus for cooling and freezing fish or the like comprising a rotatably mounted drum divided into a plurality of longitudinal compartments, a fixed conduit disposed axially of said drum and provided with perforations at its lower half portion for delivering a refrigerating liquid to the compartments of the drum, moving, with rotation of the latter, below the horizontal plane passing through the axis of said drum, means formed on the drum to permit the discharge of the refrigerating liquid from the compartments of the drum, a tank adapted to receive the refrigerating liquid from the compartments of the drum, a refrigerating coil arranged within said tank, and a pump for forcing the refrigerating liquid from the tank into the liquid delivering conduit of the drum.

In testimony whereof I have signed my name to this specification this 22 day of October 1928.

JOHANNES EMMERICK WOLFF REEH.